June 13, 1939. W. LORENZ ET AL 2,161,876

DOLL EYE AND LASH

Filed Feb. 4, 1936

INVENTORS
William Lorenz
Lazurus W. Pollack
BY
ATTORNEYS

Patented June 13, 1939

2,161,876

UNITED STATES PATENT OFFICE 2,161,876

DOLL EYE AND LASH

William Lorenz and Lazurus W. Pollack, New York, N. Y., assignors, by mesne assignments, to Margon Corporation, Bayonne, N. J., a corporation of New Jersey Application February 4, 1936, Serial No. 62,239

11 Claims. (Cl. 46—169)

This invention relates to eyes for dolls, mannikins, and other figure toys.

The primary object of our invention is to generally improve doll eyes. The invention has for a more specific object the construction of an artificial eye comprising a convex outer shell with an iris opening, and a solid or hollow hemispherical member mounted within said shell and having an iris and pupil simulation or less mounted thereon and exposed through the aforesaid iris opening.

Still another object of the invention resides in the provision of eyelashes and a convenient arrangement for securely clamping the same in place. Further objects of the invention center about the provision of locking means for holding the shell and the member tightly together in proper registry.

To the accomplishment of the foregoing and other objects which will hereinafter appear, our invention consists in the eye elements, and their relation one to the other, as hereinafter are more particularly described in the specification and sought to be defined in the claims. The specification is accompanied by a drawing in which:

Figure 1:
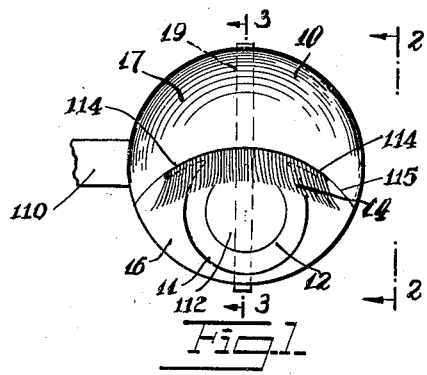
Fig. 1 is a front elevational view of an artificial eye constructed according to this invention.
Figure 2:
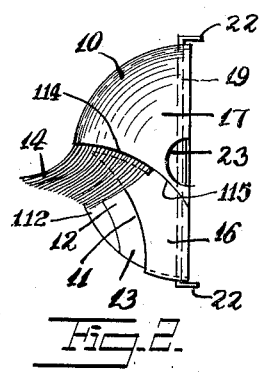
Fig. 2 is a side elevational view of Fig. 1 seen as though looking in the direction of the arrows 2—2 of Fig. 1.

Referring to the drawing and more particularly to Figs. 1 through 6 thereof, the artificial eye, according to the present invention, comprises a convex shell 10 having an opening 11 suitably dimensioned to expose an iris and pupil element or lens 12. The shell is preferably though not necessarily made of sheet metal drawn to the desired shape, a hemispherical shape being most suitable. The lens 12 is mounted upon or embedded in a solid approximately hemispherical member 13. This member 13 may be molded of any desired moldable material and is given a configuration and dimension suitable to be received within the shell 10. Glass may be used for the inner member 13, but in this form of the invention it is not essential that the member be transparent, and it is therefore not necessary to use glass. The lens 12 need not be described in detail other than to say that it preferably includes a peripheral or iris portion which is colored, and a dark or black center portion 112 which simulates the pupil of the eye. The iris and pupil element 12 mounted on the inner member 13, is preferably an insert, as shown, because then the element may be given depth and may be shaped, if desired, to act as a lens, all in accordance with known or conventional practice. However, it will be understood that iris and pupil simulations may, if desired, be merely painted or printed on the outer surface of inner member 13. When an insert is used, as is here the case, the insert is preferably slightly larger in diameter than the iris opening 11 in the outer shell, thus guarding effectively against any possibility of escape of the lens through the iris opening.

The eye member is preferably oscillatably mounted in back of the eye opening in a doll head, and for this purpose may be mounted on a suitable cross connection, in accordance with known conventional practice. In the present case we have merely indicated a strap 110 formed integrally with and bent sidewardly from the rear edge of shell 10. Other forms of connection to the shell may also be used.

The eye member is preferably provided with eyelashes 14, these eyelashes being held in place by having their inner or rear ends clamped between the outer shell 10 and the inner member 13. When eyelashes are used, the outer shell 10 is preferably slit, as is indicated at 114 in Figs. 1 and 2, the slits 114 extending to either side of and communicating with the iris opening 11. The eyelashes 14 are preferably individual hairs or strands the inner ends of which are attached to a longitudinal foundation or base strip 15, in accordance with customary practice. The base strip 15 is inserted through slits 114 and is clamped or locked between the outer shell and the inner member, as is clearly shown in Fig. 3.

It will be understood that slits 114 are arranged on a curved line shaped to conform to the upper edge of the eye opening behind which the eye is to be used. The surface of shell 10 above the lash is painted or appropriately colored to simulate an eyelid. The lower portion of the outer shell is colored white to simulate the eyeball portion of the eye. The flesh-colored or lid portion 17 of the shell is, of course, carried sidewardly beyond the ends of the slit to the edge of the shell, as is indicated by the color division line 115, thus differentiating from the white or eyeball portion 16. The eyelashes 14 appear to be arranged at the edge of the lid portion 17.

Figure 5:
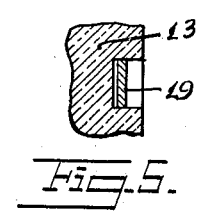
Fig. 5 is a fragmentary horizontal sectional view taken on the line 5—5 of Fig. 3.

The outer shell and inner member are held in assembled relation by a key, here exemplified by a locking strip 19 disposed in back of the inner member and passing through the shell. In order to hold the inner member in proper orientation with respect to the shell, the inner member is preferably provided with a vertical groove 20 in which the strip 19 is received, as is best shown in Fig. 5. The ends of strip 19 pass through openings 21 at the top and bottom of the shell, these openings being best shown in Fig. 4. The ends 22 of the strip 19 may be bent at right angles in order to anchor the strip in place.

It will be understood that to assemble the eye, the eyelash is first inserted in place in the outer shell, whereupon the inner member is inserted through the back of the shell and is then locked in place by the holding strip 19 disposed through the openings 21 and the groove 20. The parts are so dimensioned as to exert an adequate holding pressure on the base of the eyelash. It is not necessary to apply adhesive, but if preferred a slight touch of adhesive may be applied to the base of the lash before inserting the inner member in the shell.

Figure 7:
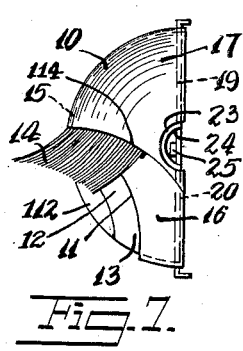
Fig. 7 is a view similar to Fig. 2 illustrating a slightly modified arrangement.
Figure 8:
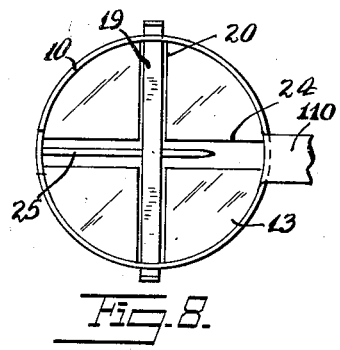
Fig. 8 is a rear elevational view of the device illustrated in Fig. 7.

In Figs. 7 and 8 a modified form of the invention has been disclosed which is similar to that already described except for the fact that the pressure between the inner member and the outer shell may be increased by wedging the parts together. More specifically, a small opening 23 is provided at one edge of the outer shell 10 and is aligned with a transverse groove 24 disposed on the back or flat side of the inner member. The grooves 20 and 24 preferably cross or communicate, as is best shown in Fig. 8. A wedge 25 is driven along groove 24 beneath strip 19, thereby increasing the tension of the holding strip on the inner member. The wedge 25 preferably takes the form of a pointed pin or strip.

Figure 9:
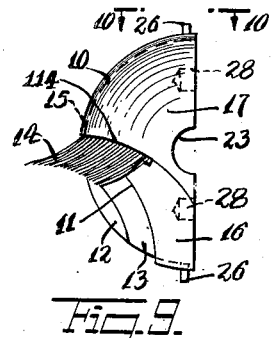
Fig. 9 is a side elevational view similar to Fig. 2 but illustrating a still further modified form of the invention.
Figure 10:
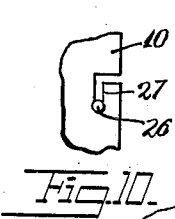
Fig. 10 is a fragmentary plan view looking in the direction of the arrows 10—10 of Fig. 9.
Figure 4:
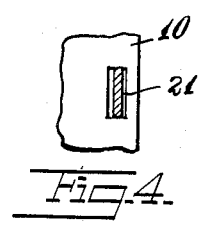
Fig. 4 is a fragmentary horizontal sectional view taken on the line 4—4 of Fig. 3.

In Figs. 9 and 10 another modification of the invention is disclosed. This form of the invention is like that first described in comprising an outer shell 10 formed with an iris opening 11 for exposing a lens or eye element 12, this lens being mounted on an inner member 13 carried within the outer shell 10. Eyelashes 14 are provided and clamped in place between the inner member and outer shell, as previously described.

In the present case, however, the inner member 13 is provided with upwardly and downwardly directed locking pins or trunnions 26, while the outer shell 10 is provided with mating or receptive bayonet slots 27. The arrangement is such that the parts may be assembled or disassembled, the latter by first giving a slight rotation to the inner member, and then moving the same rearwardly out of the shell. The inner member is preferably provided with several openings 28 adapted to receive a spanner wrench or like tool to facilitate turning the inner member when locking the pins 26 in the slots 27.

Figure 11:
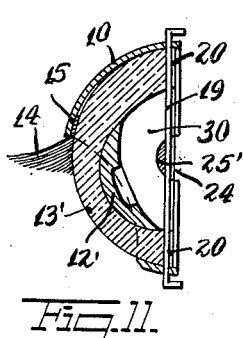
Fig. 11 is a sectional view similar to Fig. 3 but showing a still further embodiment of the invention.
Figure 12:
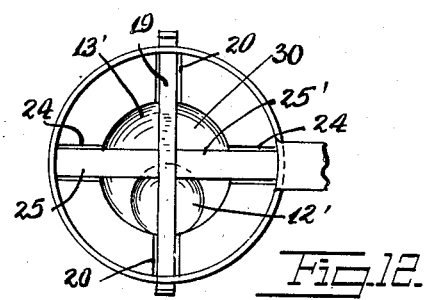
Fig. 12 is a rear elevational view of the construction shown in Fig. 11.

In the modified form of the device illustrated in Figs. 11 and 12, the artificial eye is constructed much like the form shown in Figs. 7 and 8, except that we here illustrate the use of a hollow transparent inner member having the iris and pupil simulations disposed inside instead of outside the inner member. Specifically in the present case the inner member 13' is made of transparent glass or like material, and is provided with a hollow 30 on its rear side, so that the inner member as well as the outer member is a shell. The eye element or lens 12' is disposed inside member 13' and secured in place in any desired manner, as by the use of a transparent cement. If desired, the iris and pupil simulations may be merely painted on the inside of member 13'. In either case the eye has added depth by reason of the thickness of the transparent inner member behind which the iris and pupil simulation is disposed.

In the present case the wedge is preferably made longer and stouter than that shown in Fig. 8, because it must span the hollow 30 at the back of the inner member, as is clearly shown by the strip 25' in Fig. 12. The wedge 25' functions, as before, to increase the pressure exerted by strip 19 against the inner member.

Figure 3:
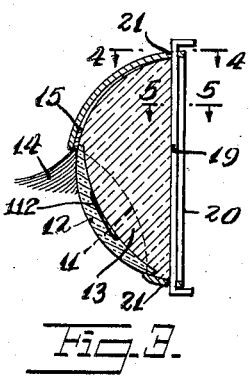
Fig. 3 is a vertical sectional view taken on the line 3—3 of Fig. 1.
Figure 6:
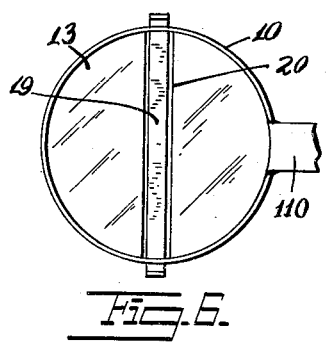
Fig. 6 is a rear elevational view of Fig. 1.

It will be understood that the sheet metal employed for the outer shell is of very thin gauge in order not to present a noticeable edge at the iris opening. Its thickness has been exaggerated in the drawing in order to clarify the construction. If the metal is of appreciable thickness, it should be swaged or thinned at the edge of the iris opening somewhat, as is indicated at the bottom of Figs. 3 and 11. This edge may be thinned during the stamping or drawing operation, or if desired, as a separate operation. In lieu of thinning the edge of the metal, it is also possible to provide the inner member when painted, or the lens when a lens is used, with an outwardly projecting iris portion which fits through the iris opening and comes flush with the outside of the sheet metal, a slight space being left between the top edge of the projection and the top edge of the iris opening to accommodate the outwardly projecting eyelashes.

It is believed that the mode of constructing as well as the many advantages of our improved doll eye, will be apparent from the foregoing detailed description thereof. It will also be apparent that while we have shown and described our invention in several preferred forms, many changes and modifications may be made in the structures disclosed without departing from the spirit of the invention defined in the following claims.

We claim:

1. A doll eye comprising a convex approximately hemispherical metallic shell formed with a sideward projection for mounting the eye, said shell having an iris opening therein, an approximately hemispherical inner member inserted in said shell and having a pupil and iris simulation exposed through said iris opening, and means for fixedly locking the inner member within the outer shell.

2. A doll eye comprising a convex metallic shell colored to simulate eyeball and eyelid portions, said shell having an opening therein which is limited in dimension to the size of the iris and an eyelash slit extending sidewardly on opposite sides of the top of the iris opening and dividing the differently colored eyeball and eyelid portions of the shell, an inner member inserted in said shell and having a pupil and iris simulation exposed through said iris opening, an eyelash projecting through the aforesaid eyelash slit and having its foundation turned upwardly and clamped between the inner member and the outer shell, and means locking the inner member tightly in engagement with the outer shell.

3. A doll eye comprising a convex approximately hemispherical metallic shell formed with a sideward projection for mounting the eye, said shell having an iris opening therein and an eyelash slit extending sidewardly on opposite sides of the top of the iris opening, an approximately hemispherical inner member inserted in said shell and having a pupil and iris simulation exposed through said iris opening, an eyelash projecting through the aforesaid eyelash slit and having its foundation turned upwardly and clamped between the inner member and the outer shell, and means locking the inner member tightly in engagement with the outer shell.

4. A doll eye comprising a convex metallic shell, said shell having an opening therein which is limited in dimension to the size of the iris and an eyelash slit extending sidewardly on opposite sides of the top of the iris opening, an inner member inserted in said shell, a lens including a pupil and iris simulation inserted in and carried by said inner member, said lens being exposed through said iris opening, an eyelash projecting through the aforesaid eyelash slit and having its foundation turned upwardly and clamped between the inner member and the outer shell, and means locking the inner member tightly in engagement with the outer shell.

5. An artificial eye for dolls, mannikins, and other figure toys, comprising a shell having a main front opening for exposing an interior eye element and having additional openings, a solid member within said shell and having an eye element exposed through said front opening, eyelashes for said element clamped at their rear ends between said shell and member, and means for holding said member in the shell comprising a strip engaging through a groove in the member and through the additional openings in the shell.

6. An artificial eye for dolls, mannkins, and other figure toys, comprising a hemispherical shell having a main front opening for exposing an interior eye element and having additional openings, a hemispherical member within said shell and having an eye element exposed through said front opening, eyelashes for said element clamped at their rear ends between said hemispherical shell and hemispherical member, and means for holding said hemispherical member in the shell comprising a strip engaging through a groove in the hemispherical member and through the additional openings in the shell, said hemispherical member being provided with representations of an iris and pupil.

7. An artificial eye for dolls, mannikins, and other figure toys, comprising a hemispherical shell having a main front opening for exposing an interior eye element and having additional top and bottom openings, a hemispherical member within said shell and having an eye element exposed through said front opening, eyelashes for said element clamped at their rear ends between said hemispherical shell and hemispherical member, and means for holding said hemispherical member in the shell comprising a strip engaging through a groove in the hemispherical member and through the additional openings in the shell, said groove in the hemispherical member being arranged upon the flat side of the member and extending vertically.

8. An artificial eye for dolls, mannikins, and other figure toys, comprising a shell having a main front opening for exposing an interior eye element and having additional openings, a member within said shell and having an eye element exposed through said front opening, eyelashes for said element clamped at their rear ends between said shell and member, and means for holding said member in the shell comprising a strip engaging through a groove in the member and through the additional openings in the shell, a transverse groove arranged in said member crossing the aforesaid groove, and a wedging element in said transverse groove wedged beneath said strip.

9. An artificial eye for dolls, mannikins, and other figure toys, comprising a shell having a main front opening for exposing an interior eye element and having additional openings, a member within said shell and having an eye element exposed through said front opening, eyelashes for said element clamped at their rear ends between said shell and member, and means for holding said member in the shell comprising a strip engaging through a groove in the hemispherical member and through the additional openings in the shell, said member being transparent, and said eye element being arranged within the surface of said member.

10. A doll eye comprising a convex approximately hemispherical metallic shell made of thin sheet metal, said shell having an iris opening therethrough, a special insert larger than said iris opening disposed within the shell immediately back of said iris opening, said insert having pupil and iris simulations, and means to help hold the insert in place in the shell, said means including a strip of metal the ends of which pass through diametrically opposed openings in the outer shell and the middle of which bears forwardly to help hold the insert in place within the shell.

11. A doll eye comprising a convex approximately hemispherical metallic shell made of thin sheet metal, said shell having an iris opening therethrough, an insert larger than the iris opening disposed immediately in back of the iris opening, said insert having pupil and iris simulations, a solid molded approximately hemispherical member secured to said shell in a suitable position in back of the aforesaid insert, and means to help hold the insert in place in the shell, said means including a strip of metal the ends of which pass through diametrically opposed openings in the outer shell and the middle of which bears forwardly to help hold the insert in place.

WILLIAM LORENZ.
LAZURUS W. POLLACK.